United States Patent

Moreno

[11] Patent Number: 5,955,004
[45] Date of Patent: Sep. 21, 1999

[54] COMPOSITION OF A PRODUCT TO PRESERVE PERISHABLE FOODSTUFFS

[76] Inventor: Alfonso De Sande Moreno, Infanta Mercedes, 103, E—28020 Madrid, Spain

[21] Appl. No.: 08/952,595
[22] PCT Filed: Jun. 24, 1996
[86] PCT No.: PCT/EP96/02742
  § 371 Date: Nov. 20, 1997
  § 102(e) Date: Nov. 20, 1997
[87] PCT Pub. No.: WO97/49294
  PCT Pub. Date: Dec. 31, 1997
[51] Int. Cl.⁶ .................................................. C09K 15/32
[52] U.S. Cl. .................................. 252/400.3; 252/400.61
[58] Field of Search ................................. 252/400.3

[56] References Cited

U.S. PATENT DOCUMENTS

| | | | |
|---|---|---|---|
| 1,598,255 | 8/1926 | Prutzman et al. | 502/408 |
| 1,598,256 | 8/1926 | Prutzman et al. | 502/410 |
| 3,049,399 | 8/1962 | Gamson et al. | 422/4 |
| 3,346,398 | 10/1967 | Tundermann et al. | 426/320 |
| 4,528,228 | 7/1985 | Clevenger | 428/74 |
| 4,623,357 | 11/1986 | Urban | 8/107 |
| 4,906,398 | 3/1990 | Alvarez et al. | 252/186.33 |

FOREIGN PATENT DOCUMENTS

| | | |
|---|---|---|
| 071533 | 2/1983 | European Pat. Off. . |
| 255461 | 2/1988 | European Pat. Off. . |
| 515764 A2 | 12/1992 | European Pat. Off. . |
| 515764 A3 | 12/1992 | European Pat. Off. . |
| 2081261 | 2/1996 | Spain . |

OTHER PUBLICATIONS

*Database WPI*, Week 7916, Derwent Publications, Ltd., AN 79–30323B & JP 54–031099.

*Database WPI*, Week 7916, Derwent Publications, Ltd., AN 79–30844B & JP 54–033503.

*Primary Examiner*—Ellen M. McAvoy
*Attorney, Agent, or Firm*—Ostrolenk, Faber, Gerb & Soffen, LLP

[57] ABSTRACT

Inert magnesium support based on meerschaum, that has a larger volume of pores due to the elimination of an important part of its magnesium ions through an appropriate complexing agent, and composition to preserve perishable materials that is made up of the said support, with at least one active substance adsorbed on it and that acts with compounds present in the environment of the said materials, in a manner that favors their preservation, and also the procedure for preparing the said support and the said composition.

23 Claims, No Drawings

COMPOSITION OF A PRODUCT TO PRESERVE PERISHABLE FOODSTUFFS

The present invention refers to an inert magnesium, with a meerschaum base, and to compositions containing the said support, particularly to preserve materials perishable in an ambient environment. It also refers to procedures for preparing this support and the said composition, as well as the use of the same, particularly for the preservation of perishable materials.

Meerschaum is a natural silicate of hydrated magnesium that belongs to the clay group. The particle structure of this material makes it an inert porous support with a specific surface advantageous for the absorption and adsorption of other products.

For example, the application of inert supports is known in compositions that are used in premises for the preservation of perishable materials, and intended to eliminate volatile compounds produced by the said materials, without any direct contact between these compositions and the perishable materials (see for example patent EP-A-0071533).

The use of meerschaum has already been foreseen as a particularly appropriate inert support for this end. In specification EP-B-0255461, a reactive adsorbent product has been described to preserve vegetable products, which includes a support based on meerschaum, impregnated with an aqueous solution of potassium permanganate which can be presented in the form of pellets, cakes, extruded items or rechargeable cartridges for filters. This adsorbent product is intended principally to eliminate ethylene given off by vegetable products by oxidation with the aid of the potassium permanganate supported by the meerschaum, and that of desorbing in a $CO_2$ medium released by the degradation of ethylene. Meerschaum is used in its natural form for impregnation.

Patent EP-A-0515764 describes a composition to control the ripening process in fruit and analogous materials, formed by a meerschaum base and, as oxidating substances, potassium permanganate and sodium peryodate. The composition is presented in the form of extruded products with a diameter of 2 to 3 mm and a length of 3 to 5 mm.

The properties and structure of the meerschaum are extensively described in patent EP-A-0515764. From this document it can be seen in particular that attempts have been made to increase the absorption properties of this support by prior treatment. Such treatments consist of increasing the volume of the meerschaum pores, for example by thorough drying at a temperature of around 100 to 300° C., preferably 200° C. Regarding this, treatments have also been foreseen with acids such as HCl, $HNO_3$ and acetic acid, as well as treatments using mechanical shearing. In this patent application, in order to increase the absorbent power of the meerschaum, the dispersion of the same is foreseen by shearing and impregnation of the meerschaum thus treated, with potassium permanganate and sodium peryodate in the presence of acetic acid.

The intent of the present invention is to prepare an inert magnesic support with a meerschaum base with obviously increased absorbent power.

According to the invention, a meerschaum base magnesic support is planned, with a larger volume of pores due to the sequestering of an important part of its magnesium ions through an appropriate complexing agent. This complexing agent for Mg ion elimination is most appropriately ethylenediaminetetraacetic acid (EDTA) or one of its salts, in particular its disodium salt.

The appropriately used complexing agent forms very stable complexes with various diatomic cations, particularly $Mg^{++}$. This is why EDTA is used preferably as a sequestering agent. The latter is a chelating ligand that has 6 donor atoms in its structure and consequently forms very stable compounds, allowing a large quantity of Mg ions to be removed from the structure of the meerschaum, thus leaving free the openings of the intercrystalline channels in the same, which greatly enhances its absorbent powers.

The invention also has as its object a composition to preserve perishable materials in an environment, with this composition having a meerschaum base able to support at least one active substance that reacts with one or various compounds present in the environment in question, in a manner favourable to the preservation of the said perishable materials.

According to the invention, a composition of this type is foreseen which to preserve perishable materials in an environment includes a meerschaum support with a larger volume of pores due to the freeing of its magnesium ions through an appropriate complexing agent. Preferably, the complexing agent to free the magnesium ions is ethylenediaminetetraacetic acid or one of its salts, particularly its disodium salt.

Because of its greater volume of pores, the composition of the invention is able to absorb a larger amount of active substance(s) for preservation purposes and finally desorb more products favourable to the preservation of the said perishables.

"Perishable materials" are to be understood here as products that degrade with time and themselves emit volatile compounds, sometimes with a rather disagreeable smell. Examples of perishable materials are all foodstuffs such as those of animal origin, shellfish, fish, meat and analogous materials, or those of vegetable origin such as agricultural or horticultural products, particularly fruit and vegetables. Non-foodstuff perishable materials can also be cited such as cut flowers, or domestic or industrial waste.

According to their nature, these perishable materials suffer different types of degradation, for example the phenomenon of melanosis or blackening. During a biochemical process, nitrogenated compounds are engendered that help to increase microbian flora, aiding the degradation of certain materials. In some cases a change in colour is also observed, as for example the appearance of a chestnut colour or discolouring, rancidity, the appearance of disagreeable odours, etc.

Until now the procedures to preserve these "perishable materials" relied mainly on the use of cold, particularly to control bacteria. Also known are compounds that are sprinkled on the fish or meat, or in which the food to be preserved is submerged. Particularly in the field of foodstuffs these compositions offer the problem that they bring the foodstuff into direct contact with active substances that do not necessarily favour consumer health.

As we have seen earlier, compositions are also known that do not come into direct contact with foodstuffs and which consequently are not mass additives. The compositions of the invention are compounds particularly perfected within this latter category of compositions intended for conservation.

According to a proceeding that is special to the invention, the active substances supported by the meerschaum, or at least one of them, is made up of inorganic non-volatile salts able to degrade by oxidation one or various volatile compounds present in the environment, particularly short chain organic matter emitted by perishable materials that must be preserved, particularly ethylene, acetaldehyde, carboxylic acids, amines, ketone, aldehydes and similar materials.

According to the invention, this type of composition is particularly advantageous to oxidize the volatile compounds present in a preservation enclosure, i.e. those that cause the phenomena of degradation that must be avoided, or which give off disagreeable odours or tastes. By oxidation, the active oxidant substances adsorbed into the meerschaum in large quantities, decompose these volatile compounds, mainly into $CO_2$ and $H_2O$. By eliminating the nitrogenate compounds in the medium and substituting these by $CO_2$, the principal feed for micro-organisms is removed, which greatly favours the duration of the preservation of perishable materials. In the same way, disagreeable smells also disappear.

According to another way to make up the invention, the mentioned active substances, or at least one of them, form one or various reducing salts or inorganic acids. In particular, they may include one or various reducing salts or inorganic acids able to give off or favour the giving off of $SO_2$ to the atmosphere in the presence of $H_2O$.

Preservation compositions are known in this category that do not come into direct contact with the products to be preserved, in which the inert support is impregnated with active oxidant substances, but until now the impregnation of a support of this type with a reducing effect was not foreseen, as occurs in the case of this invention. A release of $SO_2$ into the preservation area can be very advantageous as an enzymatic inhibitor in blackening phenomena, and as an agent that impedes reactions with colour changes. On the other hand, this compound has strong antimicrobial action since it is able to provoke attacks at points distant from the enzymatic structure of the cells. It is active against fungi and yeasts and can impede the destruction of vitamin C in foodstuffs.

A further object of the invention is a procedure to prepare the inert magnesic support based on meerschaum.

According to the invention, the meerschaum is treated, whether it is in a natural state or already treated in accordance with prior art. This treatment covers the sequestering of an important part of the magnesium ions in the meerschaum by an appropriate complexing agent. This elimination can include washing the meerschaum with a water solution of ethylene-diaminetetraacetic acid or one of its salts, particularly disodium salt.

The reaction of $Mg^{++}$ with the complexing agent $Y^{4-}$ (Y=ethylene-diaminetetraacetic acid) is the following:

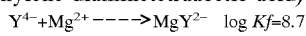
$$Y^{4-} + Mg^{2+} \longrightarrow MgY^{2-} \quad \log Kf = 8.7$$

As can be seen from the high value of the formation constant Kf, this equilibrium is moved well towards the right, and therefore forms a very stable complex. As a consequence of this reaction, the Mg ions freed by the complexing agent free the openings of the intercrystalline channels in the meerschaum without destroying its structure, which favours the absorption power of this inert support.

However, simultaneously with this elimination parasitic reactions can take place, and particularly a precipitation of $Mg(OH)_2$ which begins at a pH of 8.9. To avoid this parasitic reaction but yet aid to the maximum the reactions indicated above, and for which according to the theoretical calculation base the most favourable pH is between 8.3 and 9.5, following an advantageous manner of carrying out the invention, it is foreseen that the elimination is carried out at a pH equal to or lower than 8.8, and preferably of about 6.3 to 8, and in particular 6.5.

Another object of the invention is to prepare a composition to preserve perishable materials in an environment.

To prepare the preservation compositions in the mentioned category, that are not placed in direct contact with the perishable materials to be preserved, a procedure is already known that includes:

the dissolving in a solvent, particularly water, of at least one active substance that reacts with one or various compounds present in the said environment, in a manner favourable to the preservation of said perishable materials, the impregnation of a magnesic support with meerschaum base by means of dissolved active substance or substances, and the drying of the impregnated support.

According to the invention, prior to the said impregnating sequestering is carried out of an important part of the magnesium ions in the meerschaum, using an appropriate complexing agent.

The present invention refers also to the use of a preservation compound according to the invention, for the preservation of perishable materials in an environment, isolated, together with or successively with one or various different preservation compositions, according to the invention.

Other special details and characteristics of the invention appear in the description given below, which is not limiting, of examples of ways to carry out the invention.

EXAMPLE 1

Procedure to prepare the meerschaum.

Meerschaum is a hydrated magnesic silicate extracted from mines, particularly in Spain. Meerschaum is fibrous and formed by talc-type structures, with two layers of tetrahedric silica, joined to an octahedric layer of magnesium by oxygen atoms. This particular structure gives intercrystalline channels in a longitudinal direction, through which numerous types of fluid can penetrate, and which is the reason for interest in this support for different types of application that require the absorption of such fluids.

In the first place, the meerschaum is washed with water in proportions of 1:1. In this example, each liter of water was first treated with 0.1 ml of 1N $HNO_3$ in order to set a pH of 4. During washing this pH impedes the precipitation of Mg from the octahedric layers of the meerschaum in the form of $Mg(OH)_2$, which is one of the principal parasitic reactions that must be avoided, as described earlier. Washing must be done rapidly, with constant agitation of the mass at 2,000 rpm, and thereafter the remaining liquid is filtered when the meerschaum is impregnated. Lastly the washed and filtered meerschaum is dried. During drying, the water drains out the added $HNO_3$ and the meerschaum recovers its natural pH.

Thereafter an appropriate complexing agent is added to the meerschaum in a water solution. For the present example the complexing agent used is 0.1M $YH_2Na_2$ which is ethylene-diaminetetraacetic acid disodium salt. The meerschaum is washed with this solution containing 37.22 gr of complexing agent per liter of water, in order to again obtain a water/meerschaum ratio of 1/1.

The most appropriate pH to be applied during the second washing is 6.5. In fact, this is a compromise pH. It is not too high, which would cause a danger of provoking a precipitation of $Mg(OH)_2$ which must be avoided, but allows the majority appearance of the ion $YH_2^{2-}$ (complexant divalent anion) in the reaction medium, favouring the formation of a stable complex with the $Mg^{2+}$ ions. The latter leave their positions in the meerschaum structure without altering it. The natural pH of the meerschaum ranges between 7 and 8 and the acidity of the complexing agent is in itself sufficient to give an aqueous solution with a pH of 6.5.

Thereafter the water is removed and the treated meerschaum allowed to dry. It is now in a condition for mixing with active substances to preserve perishable materials, and particularly with inorganic salts.

During the first washing, HNO₃ was chosen to stabilize the pH. This product has the advantage of being an inorganic acid without problems of compatibility with the inorganic salts that must be added later. It is a strong acid and consequently the amount to be added is small, and its ions do not leave any residue in the meerschaum.

However, it is obvious that during the first washing any other acid can be used or any other substance that acts to decrease the pH.

EXAMPLE 2

Procedure for the preparation of a conserving composition of an oxidising nature.

First of all an aqueous impregnation solution is made containing oxidising agents.

In the present example these oxidising agents are formed by three non-volatile mineral salts and hydrogen peroxide. The three mineral salts are:

a dichromat, particularly sodium, potassium or ammonia a permanganate, particularly sodium or potassium a peryodate, particularly sodium or potassium The hydrogen peroxide is an amphoteric reagent that has a double function here, giving an adequate medium to produce oxidation and acting favourably on the dichromat allowing its oxidation when reduced.

These oxidising agents are added to the water in which hydrogen peroxide has first been placed. There must be total solution, and then the meerschaum is impregnated, for example that obtained in example 1. Impregnation is carried out in a mixer.

As an example, the following composition is obtained:

| | |
|---|---|
| Water | 35–30% |
| Meerschaum | 40–45% |
| Potassium dichromat | 1–3.5% |
| Potassium permanganate | 1–3.5% |
| Potassium peryodate | 3–6% |
| Hydrogen peroxide | 25–30% |

The paste obtained is then appropriately extruded, preferably at a speed of 12 kg/sec. to obtain cylindrical extrusion products with a diameter of less than 3.5 mm and size of not more than 15 mm.

The diameter of the extrusion products is preferably between 2.5 and 3.5 mm which give maximum absorption properties.

The extrusion product is then dried. To do this, for example, a drier with a nominal calorific power of 140,600 W and nominal cooling power of 116,200 W can be used, with dehydration capacity of 65 lt/hr.

Drying commences at the temperature of the product when leaving extrusion, i.e. some 30° C. Starting with this initial temperature it is increased by 10° C./hour until drying is complete, obtained at the end of 5 to 9 hours.

The product is then appropriately stabilised for 24 hours, protected from natural light and then packaged.

Packaging is in bags, industrial filters or domestic filters.

The material for the bags can be, for example, an unwoven cloth called "TYVEK" sold by the firm of DuPont de Nemours. This bag allows the interchange of gases while at the same time is impermeable to liquids.

Filters may be microsporous or microperforated receptacles, for example of high density polyethylene, adapted for placing particularly in the air intake of refrigeration chamber evaporators.

EXAMPLE 3

Procedure for preparing a preservation composition of a reducing nature.

First of all an aqueous impregnation solution is made up containing reducing agents.

In this example the reducing agents are formed by two mineral salts and two acids:

sodium or potassium bisulphide or sulphide, sodium, potassium, calcium, magnesium, ammonia, barium, cobalt, copper, mercury, nickel or lead chloride.

ascorbic acid, citric acid

Sodium bisulphide is particularly appropriate since in the presence of water vapour it releases SO₂ following the reaction:

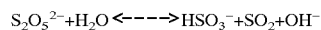

$$S_2O_5^{2-}+H_2O \longleftrightarrow HSO_3^-+SO_2+OH^-$$

As we have seen, SO₂ has a favourable effect as an enzymatic inhibitor and antioxidant.

Both acids act as accidulants and antioxidants, while NaCl for example forms a solution to regulate pH that optimizes the release of SO₂.

The meerschaum is impregnated with the aqueous solution in a mixer, to obtain the following composition:

| | |
|---|---|
| Water | 41–51% |
| Meerschaum | 40–42% |
| Sodium bisulphide | 2–6% |
| Sodium chloride | 7–15% |
| Ascorbic acid | 0–3% |
| Citric acid | 0–3% |

The paste material obtained is then extruded, dried and packaged as described in example 2.

EXAMPLE 4

Use of a composition according to the invention to preserve flowers.

Tests have been carried out with the carnation type "Light pink Tasman". The flowers were stored dry at 20° C. in noncorrosive receptacles of 70 lt. for 6 days. The storage chamber was opened every 3 days to re-establish normal air conditions.

4 lots were tested:

Control 0: without composition according to the invention.

Lot 1: composition of example 2 of the invention.

Control: injection of 0.1 ppm of ethylene in the chamber on beginning the test, without composition according to the invention.

Lot 2: the same injection but with composition according to example 2.

| | Lifetime (days) | | Ethylene concentration (in ppm) | | | | |
|---|---|---|---|---|---|---|---|
| Lots | After 3 days | After 6 days | Day 0 | Day 1 | Day 2 | Day 3 | Day 6 |
| Control 0 | 5.9 | 2.2 | 0.0 | 0.03 | 0.07 | 0.10 | 0.67 |
| Lot 1 | 5.9 | 5.2 | 0.2 | 0.02 | 0.03 | 0.03 | 0.04 |

| Lots | Lifetime (days) | | Ethylene concentration (in ppm) | | | | |
|---|---|---|---|---|---|---|---|
| | After 3 days | After 6 days | Day 0 | Day 1 | Day 2 | Day 3 | Day 6 |
| Control | 5.7 | 2.5 | 0.1 | 0.11 | 0.17 | 0.18 | 0.70 |
| Lot 2 | 6.0 | 4.8 | 0.1 | 0.04 | 0.04 | 0.04 | 0.11 |

As can be seen, the composition according to the invention increases the useful life of the flowers and eliminates the ethylene, both that produced by the flowers and that introduced when the test began.

EXAMPLE 5

A conservation test was carried out with prawns in the presence (lot 1) or absence (lot 0) of a composition as in example 2.

A parameter to indicate the freshness of the flesh of the seafood is the TMA average (triethylamine). Fresh meat contains a high percentage of TMAO (triethylamine oxide). As freshness is lost, the TMA content increases. The same examination can be carried out on all nitrogenate bases (NBVT). The majority of bacteria isolated in marine animals have better growth when they receive an abundant source of nitrogenated organic compounds.

| Day | Sample | NBVT (mg of N) | TMA (mg N) |
|---|---|---|---|
| 1 | Fresh prawns | 1.89 | |
| 3 | Lot 0 | 4.68 | 0.12 |
| | Lot 1 | 2.30 | 0.06 |
| 7 | Lot 0 | 5.35 | 0.14 |
| | Lot 1 | 4.68 | 0.08 |

EXAMPLE 6

A preservation test was carried out with meat in the presence (lot 1) or absence (lot 0) of a composition according to example 2.

On the fourth day of the test, lot 0 showed visible proof that it was no longer edible: appearance of acidity, loss of red colour, appearance of exuded liquid and strong lactic odour.

On the seventh day, lot 1 still had an appearance of being edible: the meat was still red, no acidity, exuded liquid or lactic odour were observed.

EXAMPLE 7

Protection against melanosis and blackening

During preservation, crustacea usually suffer irreversible colour change. Also some volatile compounds, particularly hydrocarbons are released to the preservation atmosphere.

In the presence of extruded pellets with a composition according to example 2, these hydrocarbons oxidised in $CO_2$ and in $H_2O$ in the form of water vapour.

If simultaneously with the composition according to example 2, a composition according to example 3 is placed in the preservation area with its marked reducing nature, in the presence of the water vapour caused as indicated above, it gives off $SO_2$ in the medium, in amounts less than 100 ppm, which is the allowable limit for contact with foodstuffs.

The $SO_2$ has a double mission:

to inhibit the dehydrogenase that cause the production of black melanosis pigments, impede various non-enzymatic darkening reactions such as Maillard's reaction.

It must be understood that the present invention is in no way limited to the manners of proceeding described above and numerous modifications can be made to the same without leaving the scope of the claims.

I claim:

1. An inert magnesium support comprising meerschaum having an increased volume of pores resulting from elimination of magnesium ions by means of a complexing agent.

2. Inert magnesium support according to claim 1, wherein the complexing agent ethylene-diaminetetraacetic acid or one of its salts.

3. Composition to preserve perishable materials in an environment, comprising:

the inert magnesium support of claim 1, and at least one perishable material preservation active substance absorbed on the said support.

4. Composition according to claim 3, wherein the complexing agent is ethylene-diaminetetraacetic acid or one of its salts.

5. Composition according to claim 3, wherein at least one of the active substances is a non-volatile inorganic salt capable of degrading by oxidation a volative compound present in the said environment.

6. Composition according to claim 3, wherein the active substance is sodium, potassium or ammonia dichromat, sodium or potassium permanganate, sodium or potassium peryodate, hydrogen peroxide or a mixture thereof.

7. Composition according to claim 6, having absorbed on the meerschaum, from 1 to 3% of potassium permanganate, 3 to 6% of potassium peryodate and 1 to 3.5% of potassium dichromat.

8. Composition according to claim 3, wherein at least one said active substance is an inorganic reducer salt or acid.

9. Composition according to claim 8, wherein the reducer causes the presence of $SO_2$ in the environment.

10. Composition according to claim 3, wherein the active substance is sodium or potassium bisuplphite, sodium or potassium sulphite, sodium, potassium, calcium, magnesium, ammonia, barium, cobalt, copper, mercury, nickel or lead chloride, ascorbic acid, citric acid or a mixture thereof.

11. Composition according to claim 10, having adsorbed on the meerschaum, from 2 to 6% of bisulphide or sulphide, from 7 to 15% of chloride, from 0 to 3% of citric acid and from 0 to 3% of ascorbic acid.

12. Composition according to claim 3, in the form of extruded, dried granules with a diameter of 2 to 5 mm and a length less than or equal to 15 mm.

13. A method for the preparation of an inert meerschaum support comprising the elimination of magnesium ions of the meerschaum by complexing said ions with a completing agent.

14. A method according to claim 13, wherein the elimination comprises a washing of the meerschaum in a water solution of ethylene-diaminetetraacetic or one of its sales.

15. A method according to claim 13, wherein the elimination is carried out at a pH equal to or lower than 8.8.

16. A method according to claim 13, wherein before the elimination the meerschaum is treated with an aqueous solution of acidifying agent, and filtering and drying of the treated meerschaum.

17. A method according to claim 16, wherein the treatment with an acidifying agent is carried out with mixing at least 2,000 rpm.

18. A method according to claim 14, comprising filtering and drying of the meerschaum following elimination.

19. A method to prepare a composition to preserve perishable material in an environment, comprising:

dissolving in a solvent of at least one active substance that reacts with a compound present in the said environment in a manner favourable for the preservation of the said perishable material, impregnation of the magnesium support of claim 1 with the active dissolved substance, and drying of the impregnated support.

20. A method according to claim 19, wherein the complexing agent is ethylene-diaminetetraacetic acid or one of its salts.

21. A method according to claim 19, wherein before drying, the impregnated magnesium support is extruded.

22. A method according to claim 21, wherein the extruded impregnated support is dried at a temperature that is increased at 10° C. per hour until complete drying is obtained.

23. In a method of preserving perishable materials in an environment by positioning a preservative in the environment without direct contact between the preservative and said perishable materials, the improvement which comprises utilizing the composition of claim 3 as the preservative.

* * * * *